United States Patent [19]

Yuen

[11] Patent Number: 5,002,153
[45] Date of Patent: Mar. 26, 1991

[54] LADDER STRUCTURE

[76] Inventor: Haison Yuen, 9-1, Lane 161, Hsing An Road Sec. 1, Taichung, Taiwan

[21] Appl. No.: 559,086

[22] Filed: Jul. 30, 1990

[51] Int. Cl.⁵ .................................................. F16B 7/00
[52] U.S. Cl. ....................................... 182/228; 182/220; 403/348; 403/263
[58] Field of Search ................ 182/228, 220; 403/348, 403/263

[56] References Cited

U.S. PATENT DOCUMENTS

| | | | |
|---|---|---|---|
| 2,989,141 | 6/1961 | Howard | 182/228 |
| 3,232,378 | 2/1966 | Larson | 182/228 |
| 3,468,093 | 9/1969 | Fuss et al. | 182/228 |
| 3,871,481 | 3/1975 | Ballek | 182/228 X |
| 4,063,836 | 12/1977 | Militano | 403/263 |

FOREIGN PATENT DOCUMENTS

| | | | |
|---|---|---|---|
| 1084595 | 1/1955 | France | 182/220 |
| 975093 | 11/1964 | United Kingdom | 182/228 |

Primary Examiner—Karen J. Chotkowski

[57] ABSTRACT

An improved ladder structure comprising a pair of stiles, a plurality of rungs, and a plurality of brackets. Wherein, each bracket consisting of two parallel arms, with a securing hole formed on each parallel arm, and a connecting surface running between the parallel arms, with a rivet hole formed thereon. Each rung has a pair of insertion recesses formed on either end, each recess being diametrically opposed with the other. At a predetermined distance inwards form each insertion recess is formed an insertion slot. Both the insertion recesses and insertion slots pass through one of a pair of through-holes formed internally on opposing arcuate surfaces of a rung, extending from one end to the other. Whereby, on either end of a rung, a pair of opposing brackets are inserted into corresponding insertion slots and insertion recesses, and subsequently secured in place by insertion of dowel pins into the through-holes. Each stile has a C-shaped cross-section with an opening running along its length, interrupted by semi-circular arcs defining entrances for corresponding rungs. An end of a rung is positioned within a stile so as to abut the arcuate surfaces of the rung against the arcuate edges of the stile entrances and align the rivet holes of the pair of opposing brackets with a corresponding pair of side holes formed on either side of the opening. Whereupon, a pair of pull-mandrel rivets secure the brackets to the stile.

4 Claims, 5 Drawing Sheets

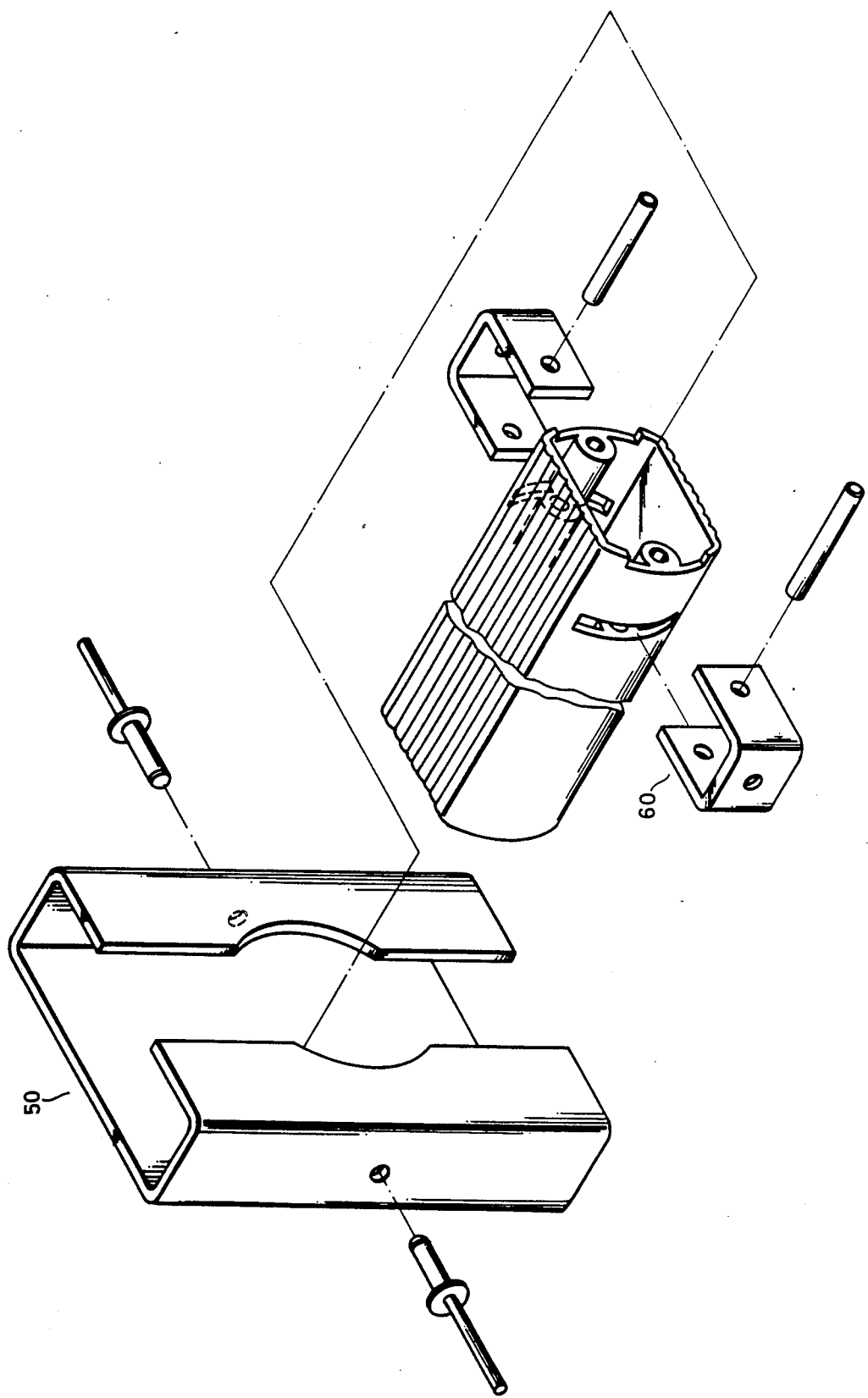

5,002,153

LADDER STRUCTURE

BACKGROUND OF THE INVENTION

The present invention relates to an improved ladder and more particularly to a ladder with an improved method of joining a rung to a stile.

Referring to FIG. 1, the stile 1 and rung 2 of a conventional ladder made of aluminum alloy are usually joined together with rivets, which does not produce a very sturdy structure, the rivets tending to buckle and shear. Moreover, being made of electrically conductive metal, a user would be exposed to possible shock hazards.

The use of fiberglass as the primary structural material would eliminate the shock hazard but would require different structural techniques. In particular, unlike the aluminum ladder, a fiberglass ladder would not normally have closed cross-section stiles, but would require a stile with an open cavity, traversed along its length by a slit-like opening.

In the ladder of the present invention, a structure catering this requirement is provided. Moreover, the structure lends itself to quick and simple assembly, even for a relatively unskilled consumer with modest hand tools.

SUMMARY OF THE INVENTION

It is in view of the above mentioned deficiencies in the prior art that the present invention was accomplished. It has as a primary object, an improved ladder structure that can be easily and quickly assembled by a user, and as a secondary object, an improved ladder structure that is amenable to manufacture from a composite material such as fiberglass.

The improved ladder structure of the present invention comprises a pair of stiles, a plurality of rungs, and a plurality of securing brackets.

Each rung has a pair of through-holes extending from one end to the other, formed within two internal protrusions. On either end of a rung are formed a pair of insertion recesses, diametrically opposed. Correspondingly, an insertion slot is formed a predetermined distance inwards from each insertion recess. Each securing bracket has a securing hole formed on each of a pair of parallel arms, whereby the parallel arms of a bracket can be inserted into a rung through an insertion recess and insertion slot, aligning the pair of securing holes on the bracket with a through-hole of the rung. A dowel pin inserted into the through-hole will then secure the bracket to the rung. A pair of opposing brackets are thus secured to each end of a rung.

The elongate stiles have the form of a hollow oval tube with an opening extending along its length, making them very suitable for manufacture from composite materials, such as fiberglass. Each opening has semi-circular entrances formed at equal intervals for recieving the ends of rungs with attached pairs of brackets. A rung once inserted, with the pair of brackets aligned with the axis of the opening, is rotated so that the rung, which has arcuate side faces, rest against the arcuate edges of the entrance.

For the purpose of securing the rung to a stile, a rivet hole is provided on each bracket, as is a pair of corresponding side holes formed on each respective side of an entrance. The pair of side holes and pair of rivet holes are aligned by the rotation of the rung after insertion into the stile, as mentioned above, and secured by a pair of pull-mandrel rivets, each passing through a respective side hole and rivet hole.

As is readily apparent from the above discussion, a ladder utilizing this form of construction can be easily assembled by an unskilled user using simple hand tools.

DESCRIPTION OF THE DRAWINGS

FIG. 5 is an exploded view of an alternate embodiment of the present invention.

PREFERRED EMBODIMENT OF THE PRESENT INVENTION

Figure 1:
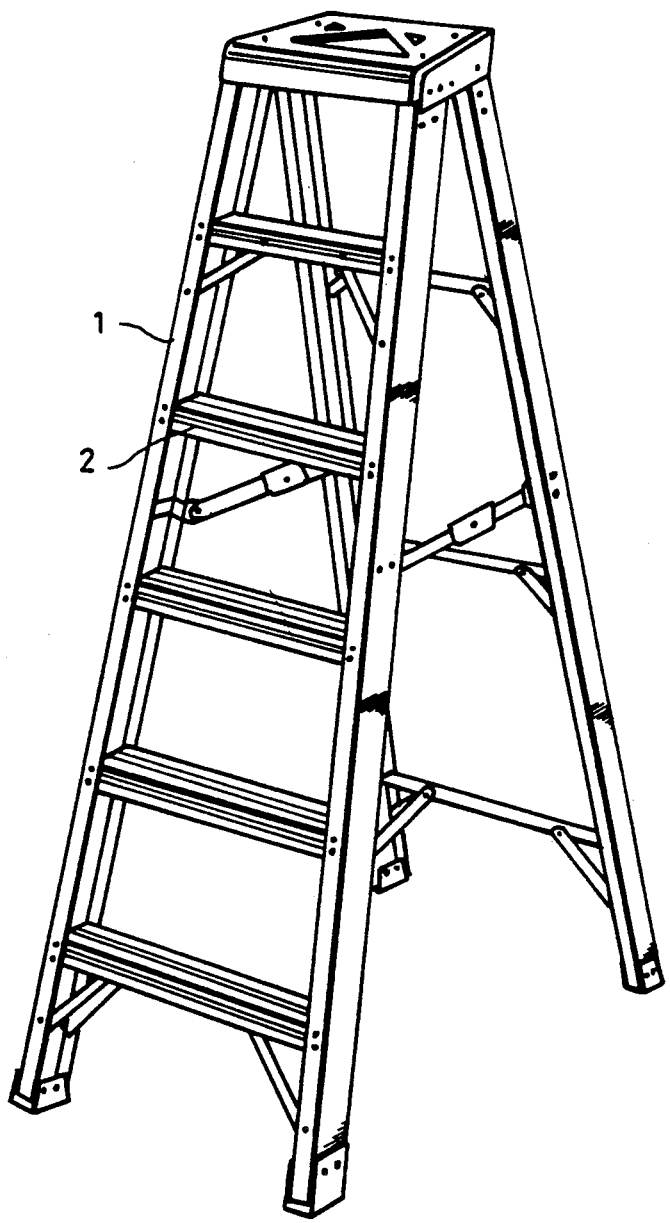
FIG. 1 is a perspective view of a conventional ladder.
Figure 2:
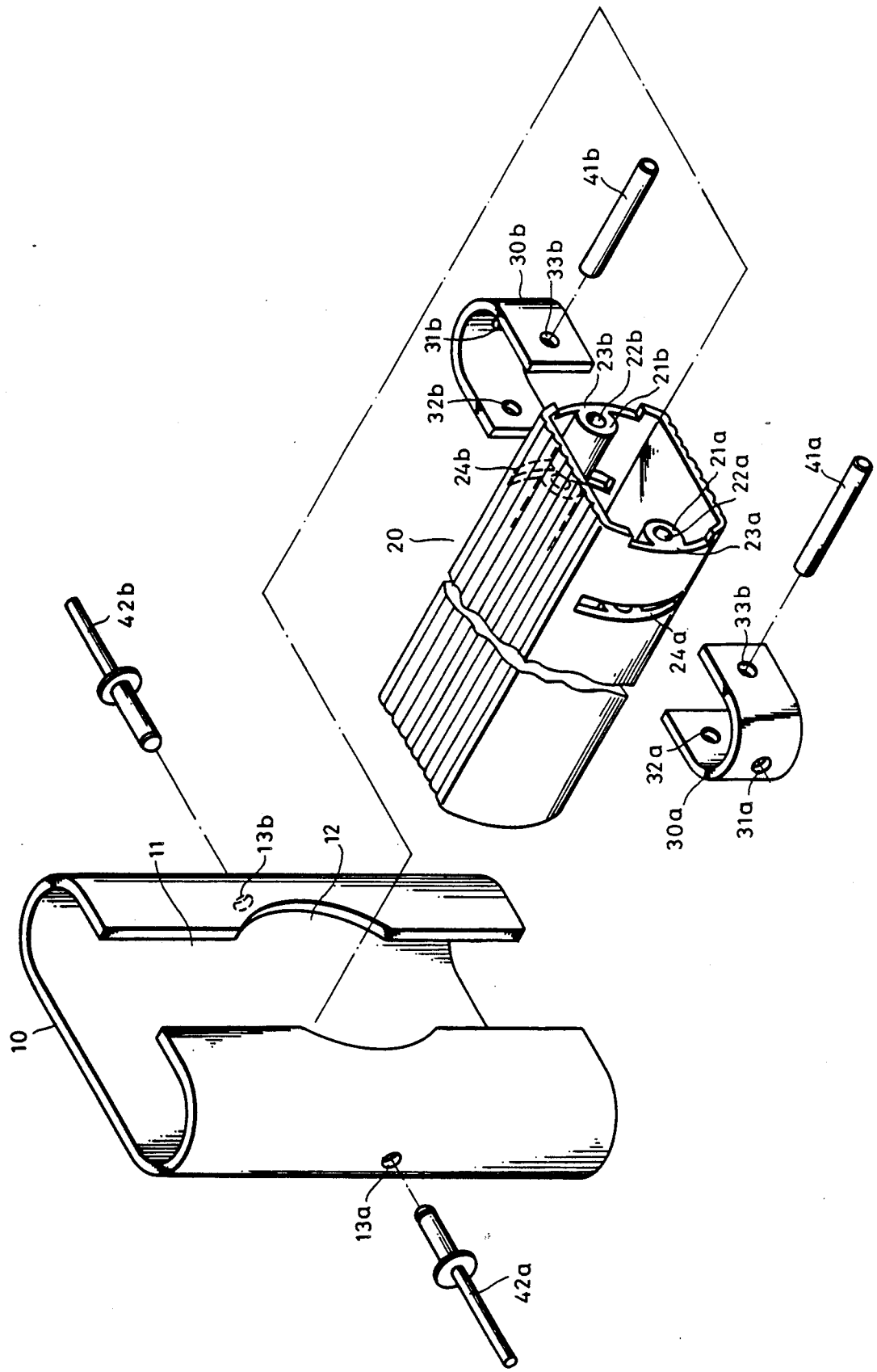
FIG. 2 is an exploded view of an embodiment of the the present invention.

Referring to FIG. 2, the improvement of a ladder structure of the present invention includes an elongate stile 10, with a C-shaped cross-section and manufactured from fiberglass, elongate hollow rung 20 manufactured from an aluminum alloy, and a pair of steel attachment brackets 30a and 30b.

Hollow rung 20 has two, essentially flat opposing faces adjoined on either side by opposing arcuate faces. Elongate axial protrusions 21a and 21b are formed respectively on the center of the inner surface of either arcuate face of rung 20. Running along the lengths of axial protrusions 21a and 21b are through holes 22a and 22b, respectively. A pair of insertion recesses 23a and 23b are formed on a terminal end of rung 20, one on each respective arcuate face. Correspondingly, a pair of insertion slots 24a and 24b are formed on the arcuate faces of rung 20, a pre-determined distance inwards from and parallel with respective insertion recesses 23a and 23b, insertion slot 24b being shown in phantom view. Both the insertion recesses 23a and 23b and insertion slots 24a and 24b extend through the respective axial protrusion 21a and 21b.

A pair of U-shaped attachment brackets 30a and 30b have rivet holes 31a and 31b formed on the centers of their arcuate sections. Securing holes, 32a and 32b, and 33a and 33b, are formed on the parallel arms of securing brackets 30a and 30b, respectively.

The space between the parallel arms of the securing bracket 30a correspond in width with the separation between the insertion slot 24a and insertion recess 23a. A similar relation exists for securing bracket 30b. The thickness of the parallel arms of the securing brackets are also slightly less than the width of insertion slots 24a and 24b. Securing brackets 30a can thus be inserted into rung 20, with securing holes 32a and 33b aligned over through-hole 22a. With securing bracket 30b similarly disposed, dowel pins 41a and 41b are forceably inserted, respectively, into through-holes 22a and 22b, passing through securing holes, 32a and 33a, and 32b and 33b. The two securing brackets 30a and 30b are thus rigidly attached to rung 20.

Figure 3:
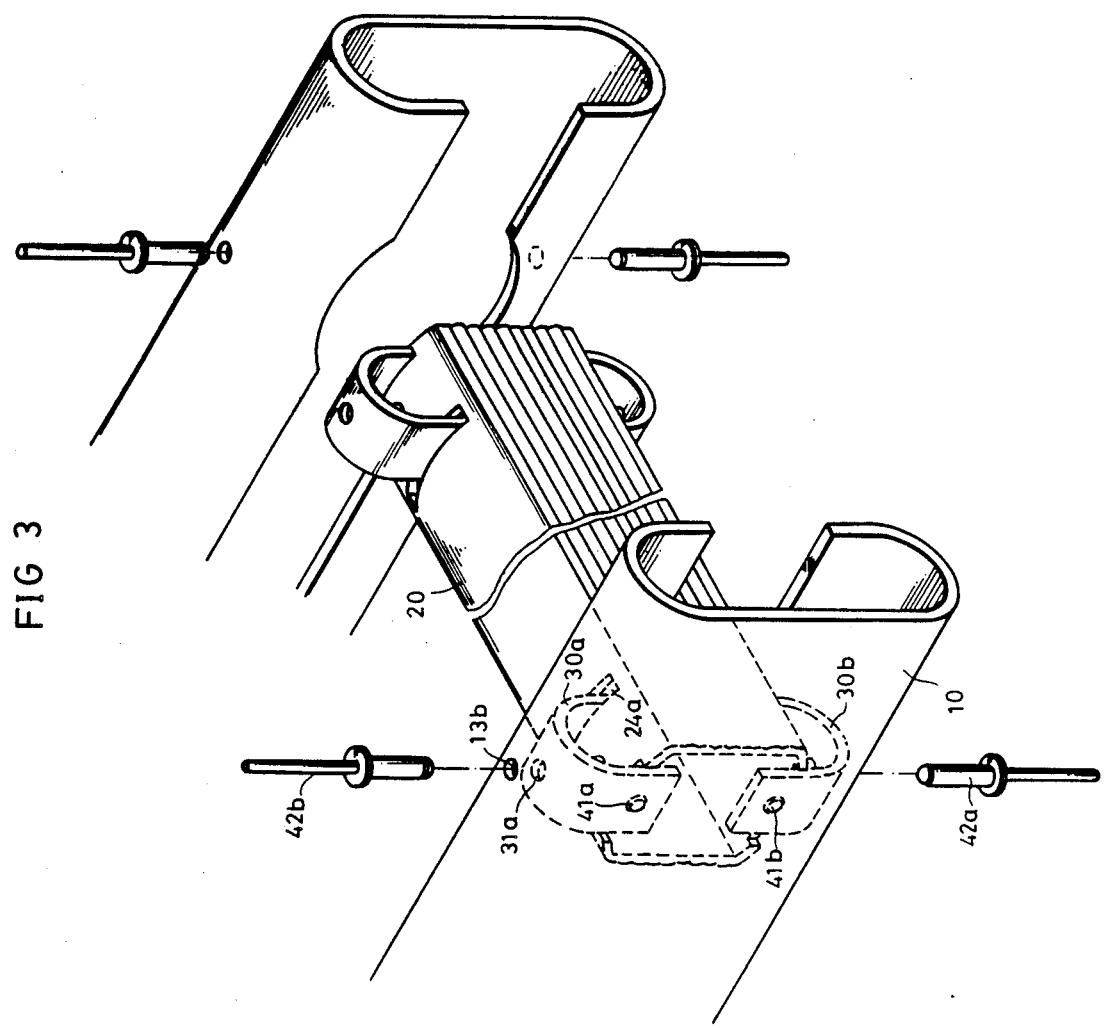
FIG. 3 is a phantom view of a rung with assembled support brackets within a stile.

Another pair of securing brackets are similarly attached to the opposite end of rung 20, as shown in FIG. 3.

The C-shaped cross-section of the elongate stile 10 defines an opening 11 which runs along the length of the stile 10. The straight edges of the opening 11 is interrupted at equal length intervals by the arcuate edges of semi-circular entrances 12, of which one is shown. The positions of the semi-circular entrances correspond with the positions of the rungs of the assembled ladder.

One end of rung 20, including securing brackets 30a and 30b being aligned with the axis of the stile 10, can then be inserted through the semi-circular entrance 12, whose arcuate edges have a radius substantially equal with the radius of curvature of the arcuate faces of rung 20. Upon rotation through a 90 degree angle, the arcuate faces of rung 20 then rest against the arcuate edges of semi-circular entrance 12, which prevents any translatory motion of the rung 20, acting as a load bearing surface.

To give further structural support and prevent further rotation of the rung 20, the respective rivet holes 31a and 31b, of securing brackets 30a and 30b are aligned with side holes 13a and 13b, respectively.

Figure 4:
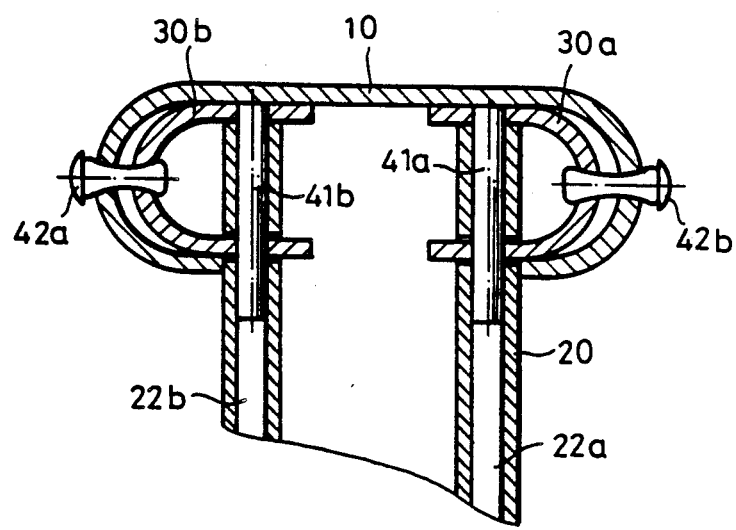
FIG. 4 is a sectional view of the assembled improvement of the present invention taken along line 1—1 of FIG. 3.

Pull-mandrel rivets 42a and 42b can then be inserted first through side holes 13a and 13b, and then through rivet holes 31a and 31b, respectively. After being riveted in place, the pull-mandrel rivets 42a and 42b complete the joint by rigidly securing rung 20 with stile 10, as is explicit in the cross-sectional view of FIG. 4.

As shown in FIG. 3, the opposite end of rung 20 is similarly secured to an opposing stile.

From the above discussion, it is readily apparent that a ladder utilizing this form of construction can be easily assembled by an end user with some simple hand tools.

Although the description provides many specificities, this should not be construed as limiting the scope of the invention, but merely serves to illustrate one embodiment of the present invention. For example, the stile and securing bracket can assume different cross-sectional shapes as in the stile 50 and securing bracket 60, as shown in FIG. 5, which approximate a significant portion of a rectangular section.

TABLE OF DRAWING NUMBERS

10—stile
11—opening
12—semi-circular entrance
13a—side hole
13b—side hole
20—rung
21a—axial protrusion
21b—axial protrusion
22a—through hole
22b—through hole
23a—insertion recess
23b—insertion recess
24a—insertion slot
24b—insertion slot
30a—securing bracket
30b—securing bracket
31a—rivet hole
31b—rivet hole
32a—securing hole
32b—securing hole
33a—securing hole
33b—securing hole
41a—dowel pin
41b—dowel pin
42a—pull-mandrel rivet
42b—pull-mandrel rivet

I claim:

1. An improved ladder structure comprising at least one pair of elongate stiles with a plurality of rungs extending between and connected on either end with said stiles:
    said rungs provide two substantially flat and opposing faces, adjoined on either side by a pair of arcuate faces;
    said elongate stiles are hollow, each traversed along its length by an opening, interrupted at pre-determined intervals by a plurality of entrances defined by semi-circular arcs along the edges of said opening, the radius of said semi-circular arcs being substantially equal with the radius of curvature of said arcuate faces of said rungs, whereupon said rungs can be inserted into said stiles through said entrances and upon rotation through a suitable angle, said arcuate faces of said rung will rest against the edges of said semi-circular arcs of said entrances;
    each said rung having a pair of support elements, one said support element disposed on each end of said rung, rigidly secured to said rung with a first attachment means;
    said support elements, rigidly secured to said rung, are attached to a respective said stile with a second attachment means.

2. An improved ladder structure as claimed in claim (1) wherein:
    an axial protrusion, extending along the length of said rung, is formed on the center of the inner surface of each said arcuate face of said rung with a through-hole extending through the length of said axial protrusion:
    each said arcuate face of said rung has a pair of recesses formed in proximity to either terminal end of said rung, passing through said axial protrusion and said through-hole;
    each said support elements consist of a pair of brackets, each said bracket having a pair of parallel arms, with a securing hole formed on each said parallel arm;
    said first attachment means, securing said pair of brackets to said rung, comprises a pair of dowel pins;
    whereby, said pair of parallel arms of each said bracket can be inserted into a respective said pair of recesses, with said securing holes of said parallel arms aligned with said through-holes of said axial protrusions, each said bracket being disposed on the same end of said rung and on opposing said arcuate faces,
    said brackets can then be rigidly secured to said rung by insertion of said pair of dowel pins through the respective said through-holes of opposing said arcuate faces.

3. An improved ladder structure as claimed in claim (2) wherein:
    each said bracket has an attachment hole formed on a surface connecting said parallel arms of said bracket;
    a plurality of pairs of side holes are formed on each side stile, one said side hole on each respective side of said opening, in proximity to said entrances, for each corresponding said rung;
    said second attachment means, securing said brackets of said rung to said stile, consists of a pair of rivets;
    whereby, pairs of said attachment holes on respective pairs of said brackets, disposed on either end of each said rung, can be aligned with a corresponding pairs of said side holes, and secured in place by means of pairs of said rivets, each rivet being inserted through a respective side hole of said pair of side holes, and passing through an aligned said attachment hole of one said bracket, is deformed to secure the rung and brackets assembly onto said stile.

4. An improved ladder structure as in claim (3) wherein said stile is manufactured from fiber reinforced plastic material.

* * * * *